United States Patent
Yamasaki (10) Patent No.: US 9,666,226 B1
(45) Date of Patent: May 30, 2017

(54) IMPEDANCE MATCHING FOR AN INTEGRATED CIRCUIT OF A MAGNETIC DISK DEVICE

(71) Applicant: KABUSHIKI KAISHA TOSHIBA, Tokyo (JP)

(72) Inventor: Nobuyoshi Yamasaki, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/059,146

(22) Filed: Mar. 2, 2016

Related U.S. Application Data (60) Provisional application No. 62/259,003, filed on Nov. 23, 2015.

(51) Int. Cl.
*G11B 5/02* (2006.01)
*G11B 20/10* (2006.01)
*G11B 5/09* (2006.01)

(52) U.S. Cl.
CPC .......... *G11B 20/10009* (2013.01); *G11B 5/09* (2013.01)

(58) Field of Classification Search
CPC ... G11B 2020/90; G11B 15/087; G11B 20/06; G11B 20/10009; G11B 5/09; G11B 5/012; G11B 5/00; G11B 5/035; G11B 5/02; H04N 5/92

USPC .......... 360/27, 30, 31, 39, 46, 55, 65, 68, 67
See application file for complete search history.

(56) References Cited

U.S. PATENT DOCUMENTS

| | | | |
|---|---|---|---|
| 6,073,195 A | 6/2000 | Okada | |
| 6,118,350 A | 9/2000 | Gupta et al. | |
| 7,619,843 B2 * | 11/2009 | Contreras | G11B 5/02 360/46 |
| 7,746,591 B2 * | 6/2010 | Escobar-Bowser | G11B 5/02 327/110 |
| 9,165,596 B1 * | 10/2015 | Contreras | |
| 2002/0156960 A1 | 10/2002 | Koga | |

* cited by examiner

Primary Examiner — Nabil Hindi
(74) Attorney, Agent, or Firm — Patterson & Sheridan, LLP (57) ABSTRACT

An integrated circuit connectable to a signal transmission path of a storage device includes an impedance setting circuit including a plurality of switches, a detector configured to detect an input signal level, and a decoder. The decoder controls one or more switches of the impedance setting circuit based on the detected input signal level so as to match an impedance of the integrated circuit with an impedance of the signal transmission path.

18 Claims, 5 Drawing Sheets

| T level | Number of preamplifier ICs | SS1 (S1,S3) | SS2 (S2,S4) |
|---|---|---|---|
| L | 1 | H (On) | L (Off) |
| H | 2 | L (Off) | H (On) |

F I G. 5

IMPEDANCE MATCHING FOR AN INTEGRATED CIRCUIT OF A MAGNETIC DISK DEVICE

CROSS-REFERENCE TO RELATED APPLICATION

This application is based upon and claims the benefit of priority from Provisional Application No. 62/259,003, filed Nov. 23, 2015, the entire contents of which are incorporated herein by reference.

FIELD

Embodiments described herein relate generally to an integrated circuit of a magnetic disk device, and in particular an impedance matching for the integrated circuit of the magnetic disk device.

BACKGROUND

Today, the number of disks (magnetic disks) included in a magnetic disk device is increasing. In accordance with the increase in the number of disks, the number of heads (magnetic heads) is also increasing. The magnetic disk devices have a signal processing circuit including a read amplifier circuit for processing (for example, amplifying) a signal read by a selected head, and sending the processed signal to a transmission path. The signal processing circuit includes a write driver circuit for converting, into a write current, a write signal transferred through another transmission path, and sending the write current to a selected head. In general, the signal processing circuit is formed in an integrated circuit (IC) of a single package. The IC is generally referred to as a preamplifier IC (or a head IC).

Conventionally, a single preamplifier IC is used to operate a plurality of heads included in a magnetic disk device. The preamplifier IC is generally mounted on a flexible printed circuit (FPC) board.

On the other hand, a magnetic disk device of one type includes, on a FPC board, a plurality of preamplifier ICs of the same configuration corresponding to a plurality of heads, respectively. In general, the FPC board is connected through a connector to a large-scale integrated circuit (LSI), called a system-on-a-chip (SOC), wherein a plurality of circuits are integrated on a single chip. More specifically, a plurality of preamplifier ICs on the FPC board are connected to a main LSI through a transmission path.

The transmission path is used for transmitting a signal at a high speed between the main LSI and (one of) the plurality of preamplifier ICs. During the high-speed transmission, in order to prevent signal disorder, it is preferable to make the impedance of the main LSI match the impedance of the transmission path and the impedance of the transmission path match the impedance of the preamplifier ICs.

DETAILED DESCRIPTION

Various embodiments will be described hereinafter with reference to the accompanying drawings.

In general, according to an embodiment, an integrated circuit connectable to a signal transmission path of a storage device includes an impedance setting circuit including a plurality of switches, a detector configured to detect an input signal level, and a decoder configured to control one or more of the switches of the impedance setting circuit based on the detected input signal level so as to match an impedance of the integrated circuit with an impedance of the signal transmission path.

Figure 1:
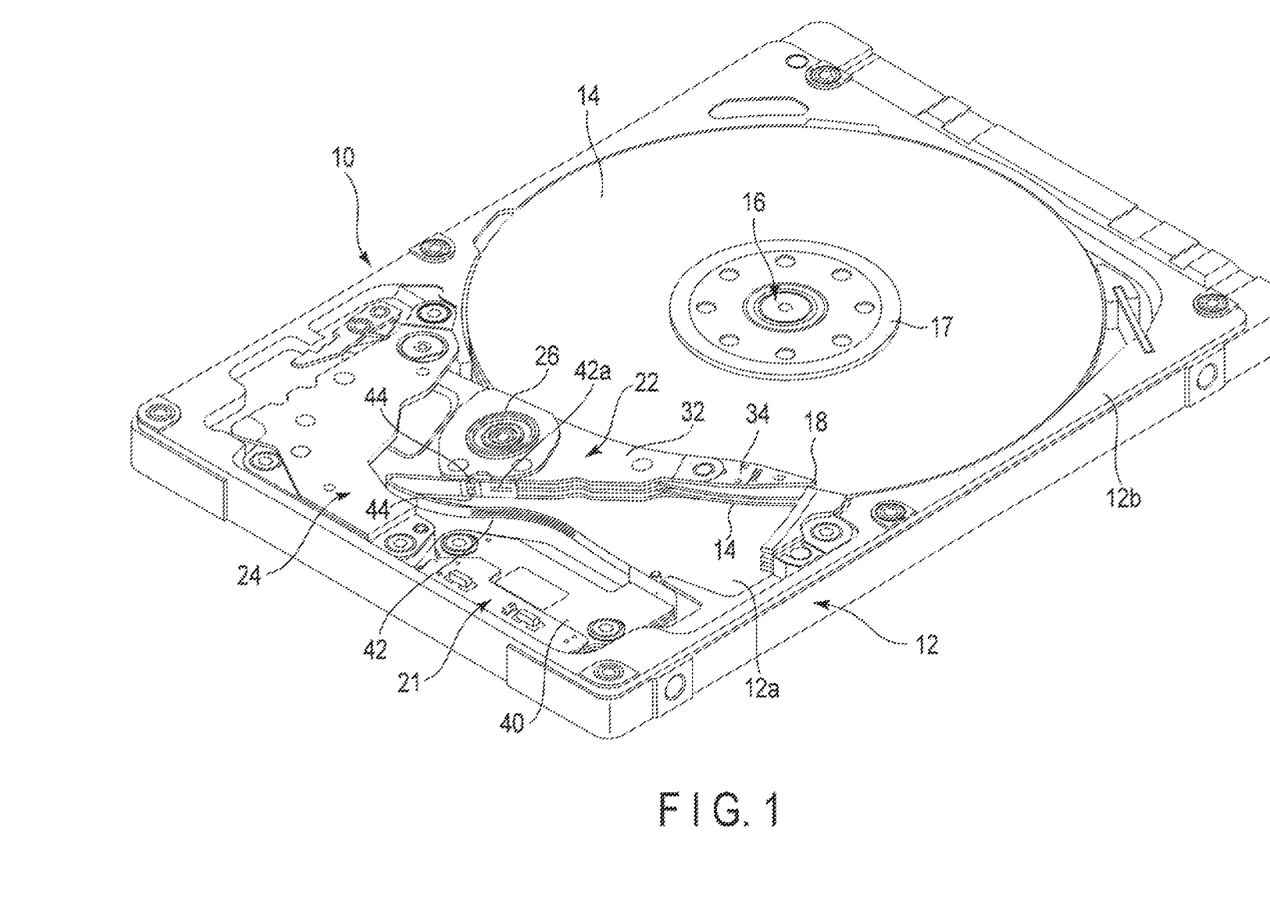
FIG. 1 is a perspective view of a magnetic disk device (HDD) according to an embodiment.

FIG. 1 is a perspective view of a magnetic disk device according to an embodiment. The magnetic disk device is also called a hard disk drive (HDD). In the description below, the magnetic disk device will be referred to as the HDD. The HDD includes a housing 10 as shown in FIG. 1. The housing 10 has a rectangular box-shaped base 12 having an upper opening, and a top cover (not shown). The top cover is screwed to the base 12 with a plurality of screws, thereby covering the upper opening of the base 12. The base 12 has a rectangular bottom 12a, and sidewalls 12b standing along the periphery of the bottom 12a.

The housing 10 houses two, for example, disks (magnetic disks) 14 as recording media, and a spindle motor (SPM) 16. Each of the disks 14 has two sides serving as recording surfaces on which data are magnetically recorded. The SPM 16 is disposed on the bottom 12a, and used to rotate the disks 14. The disks 14 are coaxially fitted on the hub (not shown) of the SPM 16, and are clamped by a clamp spring 17, whereby they are secured to the hub.

The housing 10 also houses four, for example, heads 18, and a head stack assembly (HSA) 22. The heads 18 are arranged corresponding to the recording surfaces of the respective disks 14, and each include a read element used to read data from a corresponding disk 14 (recording surface), and a write element used to write data to the corresponding disk 14 (recording surface). The HSA 22 supports the heads 18 such that they are movable with respect to the disks 14.

The housing 10 further houses a flexible printed circuit (FPC) unit 21 and a voice coil motor (VCM) 24. The VCM 24 is driven in accordance with a drive current (voltage) supplied (applied) by a driver IC 52 (see FIG. 3), thereby pivotally moving the HSA 22. The FPC unit 21 has a substantially rectangular base portion 40 and a band-like relay FPC 42 extending from one edge of the base portion 40, the base portion 40 and the relay FPC 42 being formed integral as one body. The base portion 40 and the relay FPC 42 are formed of the FPC board. The FPC board includes an insulating layer of, for example, polyimide, a conductive layer formed on the insulating layer and serving as traces, connection pads, etc., and a protective layer covering the conductive layer.

The HSA 22 includes a rotatable bearing 26, a plurality of arms 32, and a plurality of suspensions 34. The arms 32 are attached to the bearing 26, and arranged in a stacked manner. The suspensions 34 extend from the respective arms 32. The heads 18 are supported by the tips of the respective suspensions 34. In the present embodiment, the numbers of arms 32 and suspensions 34 are 3 and 4, respectively, and hence the number of heads 18 is 4 (see FIG. 3).

Trace members (flexure members), which are not shown, are secured to the respective arms 32 and suspensions 34. An end of each trace member is connected to the corresponding head 18, and the other end is connected to the relay FPC 42 of the FPC unit 21. As a result, the heads 18 supported by the suspensions 34 are electrically connected to the FPC unit 21 through the trace members and the relay FPC 42.

One end of the relay FPC 42 is connected to the base portion 40, and the other end is used as the connection end portion 42a. The relay FPC 42 includes a plurality of traces that extends from the base portion 40 to the connection end portion 42a. Two preamplifier ICs 44 are mounted on the connection end portion 42a. In the present embodiment, the two preamplifier ICs 44 have the same circuit configuration. Each of the two preamplifier ICs 44 is connected to two of the heads 18 via the above-mentioned trace members, thereby supporting read/write by the two heads 18. The preamplifier ICs 44 are connected to the traces on the relay FPC 42.

A plurality of contact pads is arranged on the connection end portion 42a for connecting the end portion 42a to the above-mentioned traces. The base portion 40 is connected to a main printed circuit board (PCB) 50 (see FIG. 2) through a connector 46 (see FIG. 2). The main PCB 50 is screwed to the outer surface of the bottom 12a of the base 12, although not shown in FIG. 1. A plurality of main circuits in the HDD is arranged on the main PCB 50.

Figure 2:
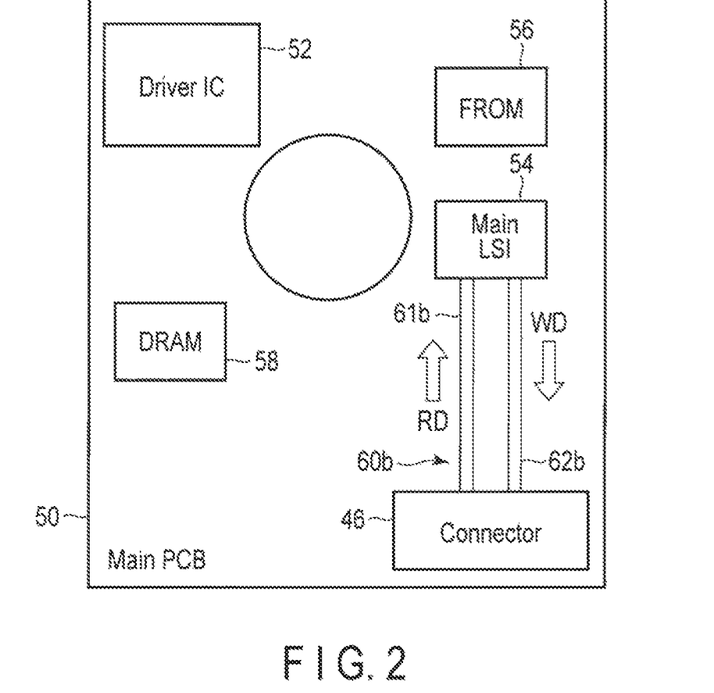
FIG. 2 illustrates a printed circuit board mounted in the HDD.

FIG. 2 shows an exemplary circuit layout on the main PCB 50 that is incorporated in the HDD shown in FIG. 1. As shown in FIG. 2, on the main PCB 50, the connector 46, the driver IC 52, a main LSI 54, a flash ROM (FROM) 56, and a dynamic RAM (DRAM) 58 are arranged (mounted). The main LSI 54 is connected to the connector 46 through a signal-line (trace) group 60b formed on the main PCB 50. The signal-line group 60b includes a transmission path 61b used for transmission of a read signal RD, and a transmission path 62b used for transmission of a write signal WD.

Figure 3:
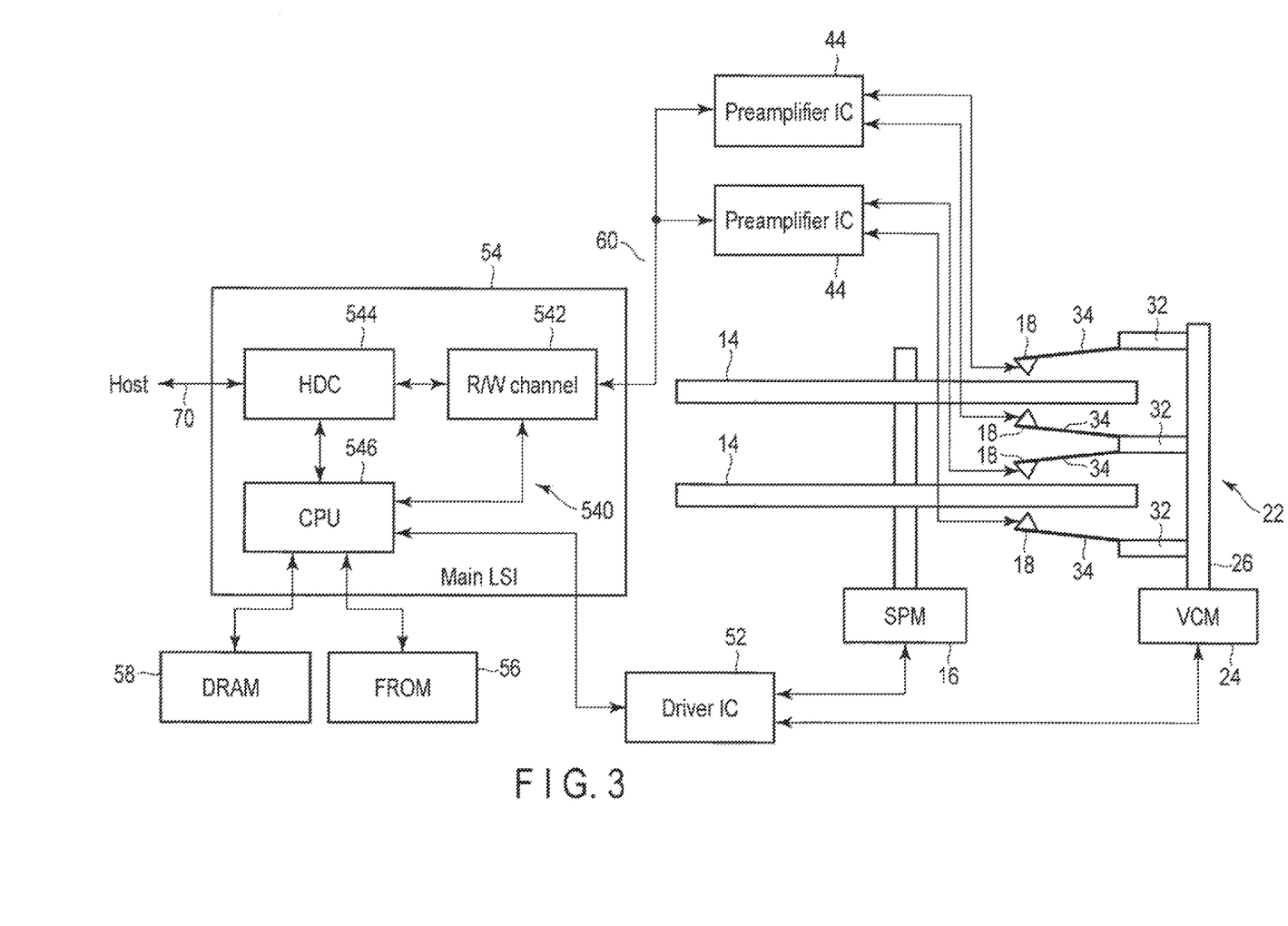
FIG. 3 is a block diagram of the HDD.

FIG. 3 is a block diagram of the HDD. The HDD includes the two disks 14, the SPM 16, the HSA 22, the VCM 24, and the two preamplifier ICs 44 that are shown in FIG. 1. The HSA 22 includes the three arms 23 and the four suspensions 34. The three arms 32 are attached to the bearing 26, in a stacked state.

The upper arm 32 of the three arms 32 is located above the upper surface of the upper disk 14 of the two disks 14, and the uppermost suspension 34 extends from the upper arm 32. The tip of the uppermost suspension 34 supports the uppermost head 18 downward, i.e., supports the uppermost head 18 toward the upper surface of the upper disk 14 (in a first orientation).

The second arm 32 from the above is located below the lower surface of the upper disk 14, and above the upper surface of the lower disk 14. Second and third suspensions 34 from the above extend from the second arm 32. The second suspension 34 supports the second head 18 upward, i.e., supports the second head 18 toward the lower surface of the upper disk 14 (in a second orientation opposite to the first orientation). The third suspension 34 supports the third head 18 toward the upper surface of the lower disk 14.

The third arm (lower arm) 32 from the above is located below the lower surface of the lower disk 14, and the fourth suspension (lowermost suspension) 34 from the above extends from the third arm 32. The fourth suspension 34 supports the fourth head 18 upward, i.e., supports the fourth head 18 toward the lower surface of the lower disk 14.

One of the two preamplifier ICs 44 is connected to the uppermost and second heads 18 through the above-described trace members. The other preamplifier IC 44 is connected to the third and fourth heads 18 through the above-described trace members.

The HDD further includes the driver IC 52, the main LSI 54, the FROM 56, and the DRAM 58, which are mounted on the main PCB 50 shown in FIG. 2. The main LSI 54 includes a control circuit 540, and includes a read/light (R/W) channel 542, a hard disk controller (HDC) 544, and a CPU 546.

The driver IC 52 drives the SPM 16 and the VCM 24 under control of the main LSI 54 (more specifically, the CPU 546 in the main LSI 54). The R/W channel 542 processes signals for reading and writing. The HDC 544 is connected to a host through a host interface 70. The HDC 544 receives commands (a write command, a read command, etc.) from the host. The HDC 544 controls data transfer between the host and the HDC 544, and data transfer between the HDC 544 and the R/W channel 542.

The CPU 546 functions as the main controller of the HDD. The CPU 546 controls at least apart of the elements of the HDD including the HDC 544 in accordance with a control program. In the present embodiment, the control program is pre-stored in a specific area of the disk 14. However, the control program may be pre-stored in the FROM 56.

The FROM 56 is rewritable nonvolatile memory. In the present embodiment, an initial program loader (IPL) is pre-stored in a storage area of the FROM 56. The CPU 546 loads, to the DRAM 58, at least a part of the control program stored on the disk 14 by, for example, executing the IPL after power is supplied to the HDD.

The DRAM 58 is volatile memory. A storage area of the DRAM 58 is used to store at least a part of the control program. Another storage area of the DRAM 58 is used as a work area for the CPU 546.

Figure 4:
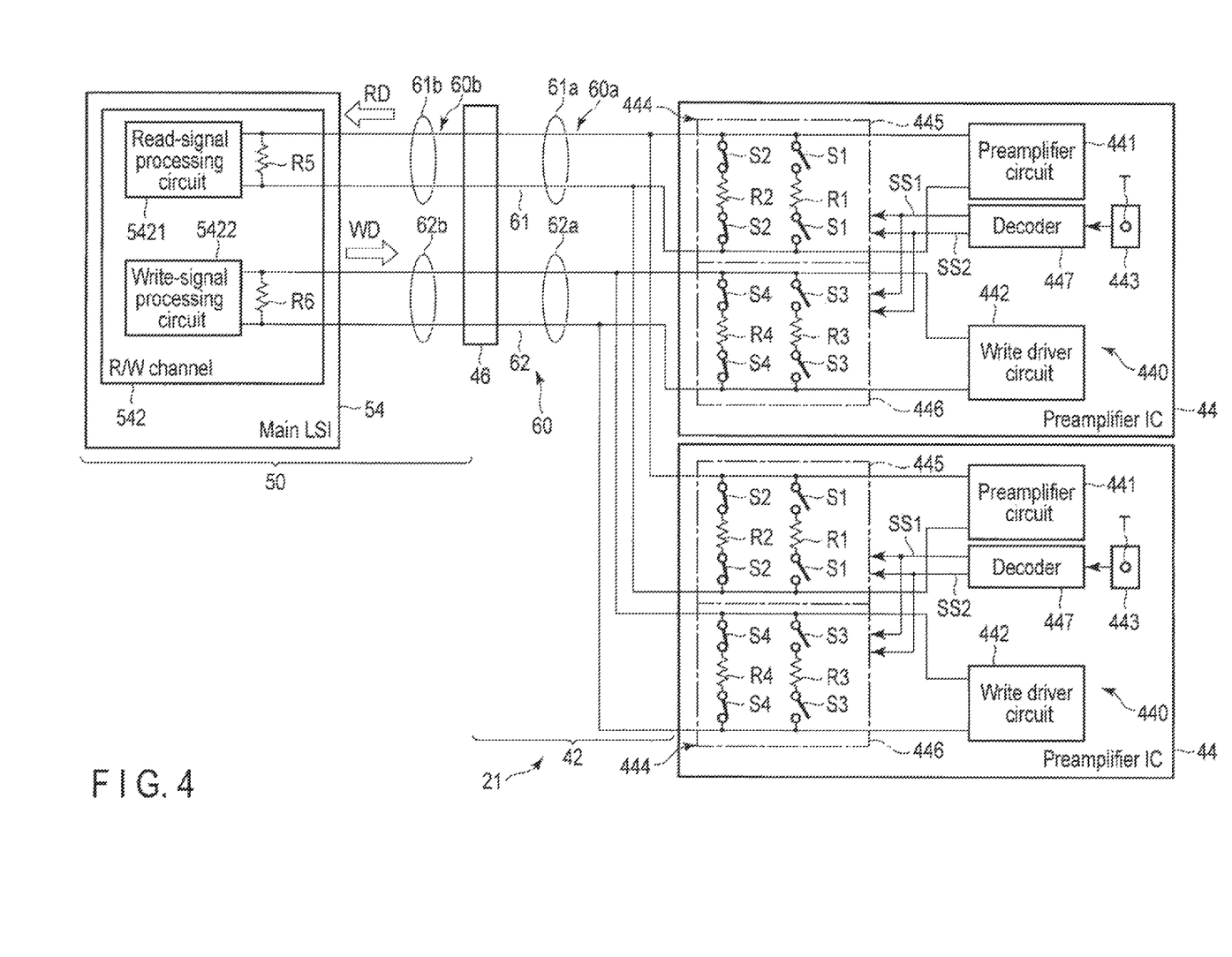
FIG. 4 illustrates two preamplifier integrated circuits in the HDD.

FIG. 4 illustrates an exemplary circuit configuration of the two preamplifier ICs shown in FIG. 3, along with a connection example of the two preamplifier ICs and the two transmission paths. Each of the preamplifier ICs 44 includes a signal processing circuit 440. The signal processing circuit 440 includes a preamplifier circuit 441, a write driver circuit 442, a detector 443, an impedance setting circuit 444, and a decoder 447. The impedance setting circuit 444 is formed of two impedance setting circuits 445 and 446.

The signal processing circuit 440 in each preamplifier IC 44 is connected to the R/W channel 542 in the main LSI 54 through the signal-line group 60. The signal-line group 60 is formed of signal-line groups 60a and 60b. Signal line group 60a is formed mainly on the relay FPC 42 of the FPC unit 21 shown in FIG. 1, and signal-line group 60b is formed on the main PCB 50, as shown in FIG. 2. Signal-line groups 60a and 60b are connected to each other through the connector 46.

The signal-line group 60 includes transmission paths 61 and 62. Transmission path (first transmission path) 61 is formed of transmission path (first portion) 61a and above-mentioned transmission path (second portion) 61b, and transmission path (second transmission path) 62 is formed of transmission path (third portion) 62a and above-mentioned transmission path (fourth portion) 62b. That is, signal-line group 60a includes transmission paths 61a and 62a, and signal-line group 60b includes transmission paths 61b and 62b. In the present embodiment, each of transmission paths 61 and 62 is formed of a pair of signal lines used for transmitting a differential signal.

The preamplifier circuit 441 amplifies (by differential amplification) a signal (read signal) read by a head selected from the two heads 18 corresponding to the preamplifier IC 44, and sends the amplified read signal to the transmission path 61. The write driver circuit 442 receives a write signal transmitted through the transmission path 62, converts the write signal into a write current, and supplies the write current to the selected head 18. In the present embodiment, the read signal and the write signal are high-frequency signals that have a frequency higher than, for example, 1 GHz.

The detector 443 detects the number of preamplifier ICs 44 (more specifically, the number of preamplifier ICs 44 having the respective detectors 443) connected to the signal-line group 60 (transmission paths 61 and 62). That is, the detector 443 detects the number of preamplifier ICs 44 mounted in the connection end portion 42a of the relay FPC 42. In the present embodiment, it is assumed that the maximum number of preamplifier ICs 44 that can be mounted in the connection end portion 42a of the relay FPC 42 is two.

In order to detect the number of mounted preamplifier ICs 44, the detector 443 has, for example, one terminal T. When a preamplifier IC 44 having the terminal T is mounted in the connection end portion 42a of the relay FPC 42, the terminal T is connected to either a ground line or a power supply line, depending upon whether one or two preamplifier ICs 44 are mounted. For instance, the voltage level (hereinafter, referred to as the T level) of the terminal T is set to high H when the terminal T is connected to the power source line, and is set to low L when the terminal T is connected to the ground line. In the present embodiment, the T level is set to low L when one preamplifier IC 44 is mounted, and is set to high H when two preamplifier ICs 44 are mounted. This enables the terminal T to indicate the number of mounted preamplifier ICs 44, i.e., the number of detected preamplifier ICs 44.

The impedance setting circuit (first impedance setting circuit) 445 selectively sets the impedance at the output side of the preamplifier circuit 441 for carrying out impedance matching with the transmission path 61. The impedance setting circuit 445 includes, for example, two resistors (terminating resistors) R1 and R2 as terminating impedance elements. It is assumed here that the impedance, for example, the resistance at the above-mentioned output side, which is used to carry out the impedance matching with the transmission path 61, is R. In this case, the resistances of resistors R1 and R2 are R and 2R, respectively. In the present embodiment, R is set to 100Ω. However, R is not limited to 100Ω.

The resistor R1 is connected to the output side of the preamplifier circuit 441 via a pair of switches S1 between a pair of signal lines of the transmission path 61. Similarly, the resistor R2 is connected to the output side of the preamplifier circuit 441 via a pair of switches S2 between the pair of signal lines of the transmission path 61. The resistors R1 and R2 are arranged in parallel between the pair of signal lines of the transmission path 61.

The impedance setting circuit (second impedance setting circuit) 446 selectively sets the impedance at the input side of the write driver circuit 442 for carrying out the impedance matching with the transmission path 62. The impedance setting circuit 446 includes, for example, two resistors (terminating resistors) R3 and R4 as terminating impedance elements. It is assumed here that the impedance, for example, the resistance at the above-mentioned input side, which is used to carry out the impedance matching with the transmission path 62, is R. In this case, the resistances of resistors R3 and R4 are R and 2R, respectively.

The resistor R3 is connected to the input side of the write driver circuit 442 via a pair of switches S3 between a pair of signal lines of the transmission path 62. Similarly, the resistor R4 is connected to the input side of the write driver circuit 442 via a pair of switches S4 between the pair of signal lines of the transmission path 62. The resistors R3 and R3 are arranged in parallel between the pair of signal lines of the transmission path 62.

The decoder 447 generates control signals SS1 and SS2 for controlling impedance setting circuits 445 and 446 in accordance with the number of preamplifier ICs 44 (T level) detected by the detector 443. The control signal SS1 is used for controlling (turning on and turning off) the switches S1 and S3 included in the impedance setting circuits 445 and 446, respectively. The control signal SS2 is used for controlling (turning on and turning off) the switches S2 and S4 included in the impedance setting circuit 445 and 446, respectively.

Figure 5:
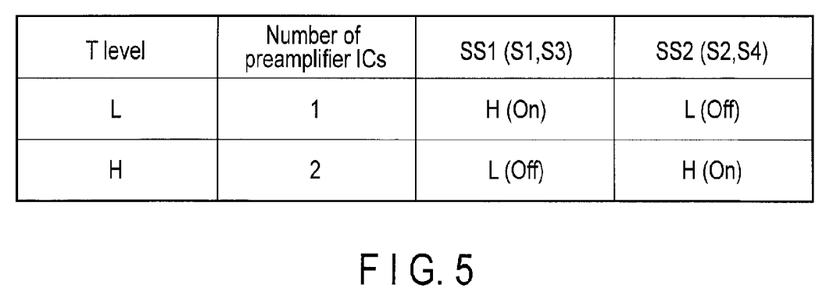
FIG. 5 illustrates an input/output logic example of a decoder in the preamplifier integrated circuit shown in FIG. 4.

FIG. 5 shows an example of the input/output logic of the decoder 447 shown in FIG. 4, i.e., a relationship among the T level, the number of preamplifier ICs 44, and levels of the control signals SS1 and SS2. When the T level is low L, i.e., when only one preamplifier IC 44 is employed, the decoder 447 sets the control signals SS1 and SS2 to high H and low L, respectively, as shown in FIG. 5. In this case, the switches S1 and S3 are turned on, and the switches S2 and S4 are turned off. In contrast, when the T level is high H, i.e., when two preamplifier ICs 44 are employed, the decoder 447 sets the control signals SS1 and SS2 to low L and high H, respectively. In this case, the switches S1 and S3 are turned off, and the switches S2 and S4 are turned on.

Referring again to FIG. 4, the R/W channel 542 in the main LSI 54 includes a read signal processing circuit 5421, a write signal processing circuit 5422, and resistors R5 and R6. The read signal processing circuit 5421 digitizes, using an analog-to-digital converter, a read signal transmitted via transmission path 61 from the preamplifier circuit 441 in the preamplifier IC 44, and decodes read data from the digitized data. Moreover, the read signal processing circuit 5421 extracts, from the digitized data, servo data required for positioning each head 18. The write signal processing circuit 5422 encodes write data, and sends a write signal corresponding to the encoded write data to transmission path 62.

The resistor R5 is an impedance element for matching the impedance at the input side of the read signal processing circuit 5421 with the impedance at the transmission path 61. The resistor R5 is connected to the input side of the read signal processing circuit 5421 between the pair of signal lines of the transmission path 61. The resistor R6 is an impedance element for matching the impedance at the output side of the write signal processing circuit 5422 with the impedance at the transmission path 62. The resistor R6 is connected to the output side of the write signal processing circuit 5422 between the pair of signal lines of the transmission path 62. The resistors R5 and R6 are set to R (e.g., 100Ω).

The input impedance of the read signal processing circuit 5421 and the output impedance of the write signal processing circuit 5422 are sufficiently high, compared to R (the resistance of the resistors R5 and R6). Therefore, the impedance at the input side of the read signal processing circuit 5421 and the impedance at the output side of the write signal processing circuit 5422 substantially coincide with the resistance (R) of the resistors R5 and R6. That is, the impedance at the input side of the read signal processing circuit 5421 and the impedance at the output side of the write signal processing circuit 5422 correspond to the impedances at the transmission paths 61 and 62, respectively.

Next, an impedance-matching operation carried out in each preamplifier ICs 44 will be described. First, as shown in FIGS. 2 and 4, it is assumed that two preamplifier ICs 44 are mounted on the connection end portion 42a of the relay FPC 42. In this case, the terminals T of the detectors 443 of the two preamplifier ICs 44 are connected to a power source line on the relay FPC 42 when the preamplifier ICs 44 are mounted on the connection end portion 42a. As a result, the terminals T are set to high H, which indicates that the two preamplifier ICs 44 having the respective terminals T are mounted on the connection end portion 42a. That is, through the detection of the detectors 443, it is determined that the number of preamplifier ICs 44 mounted on the connection end portion 42a is two.

The decoder 447 of each of the two preamplifier ICs 44 sets one of the control signals SS1 and SS2 to high H in accordance with the number of detected preamplifier ICs 44. If the number of detected preamplifier ICs 44 is two, the decoder 447 sets the control signals SS1 and SS2 to low L and high H, respectively. The pair of switches S1 and the pair of switches S3 in each of the two preamplifier ICs 44 are turned off in accordance with the low control signal SS1, and the pair of switches S2 and the pair of switches S4 in each of the two preamplifier ICs 44 are turned on in accordance with the high control signal SS2 (see FIG. 5).

At this time, in each impedance setting circuit 445 of the two preamplifier ICs 44, the resistor R1 is disconnected from the pair of signal lines of the transmission path 61, and the resistor R2 is connected to these signal lines. Similarly, in each impedance setting circuit 446 of the two preamplifier ICs 44, the resistor R3 is disconnected from the pair of signal lines of the transmission path 62, and the resistor R4 is connected to these signal lines.

That is, each impedance setting circuit 445 selectively connects the resistor R2 to the pair of signal lines of the constitute transmission path 61. Thus, the resistors R2 in the two impedance setting circuits 445 are connected in parallel with the pair of signal lines of the transmission path 61. It should be noted that the output impedance of each preamplifier circuit 441 in the two preamplifier ICs 44 is sufficiently high, compared to the resistance of the resistor R2. Accordingly, the impedance at the output side of each preamplifier circuit 441 is determined from the resistance 2R of the two resistors R2 connected in parallel, and is $1/\{(\frac{1}{2}R)+(\frac{1}{2}R)\}=R$, i.e., half the resistance 2R. The resistance R, i.e., the impedance R at the output side of each preamplifier circuit 441, corresponds to the impedance at the transmission path 61.

Similarly, each impedance setting circuit 446 selectively connects the resistor R4 to the pair of signal lines of the transmission path 62. Thus, the resistors R4 in the two impedance setting circuits 446 are connected in parallel with the pair of signal lines of the transmission path 62. It should be noted that the input impedance of each write driver circuit 442 in the two preamplifier ICs 44 is sufficiently high, compared to the resistance of the resistor R4. Accordingly, the impedance at the input side of each write driver circuit 442 is determined from the resistance 2R of the two resistors R4 connected in parallel, and is half the resistance 2R. The resistance R, i.e., the impedance R at the input side of each write driver circuit 442, corresponds to the impedance at the transmission path 62.

It is assumed here that only one preamplifier IC 44 is mounted on the connection end portion 42a of the relay FPC 42, unlike FIGS. 2 and 4. In this case, the terminal T in the detector 443 of the preamplifier IC 44 is connected to the ground line on the relay FPC 42 when the preamplifier IC 44 is mounted on the connection end portion 42a. As a result, the terminal T is set to low L, which indicates that only the preamplifier IC 44 having the terminal T is mounted on the connection end portion 42a. That is, from the detection of the detector 443, it is determined that only one preamplifier IC 44 is mounted on the connection end portion 42a.

When only one preamplifier IC 44 has been detected, the decoder 447 in the preamplifier IC 44 sets the control signals SS1 and SS2 to high H and low L, respectively. The pair of switches S1 and the pair of switches S3 in the preamplifier IC 44 are turned on in accordance with the high control signal SS1, and the pair of switches S2 and the pair of switches S4 in each preamplifier IC 44 are turned off in accordance with the low control signal SS2 (see FIG. 5).

At this time, in the impedance setting circuit 445 of the preamplifier IC 44, the resistor R1 is connected to the pair of signal lines of the transmission path 61, and the resistor R2 is disconnected from these signal lines. Similarly, in the impedance setting circuit 446 of the preamplifier IC 44, the resistor R3 is connected to the pair of signal lines of the transmission path 62, and the resistor R4 is disconnected from these signal lines.

That is, the impedance setting circuit 445 selectively connects the resistor R1 to the pair of signal lines of the transmission path 61. As a result, the impedance at the output side of the preamplifier circuit 441 coincides with the resistance R of the resistor R1. The resistance R, i.e., the impedance R at the output side of the preamplifier circuit 441, corresponds to the impedance at the transmission path 61.

Similarly, the impedance setting circuit 446 selectively connects the resistor R3 to the pair of signal lines of the transmission path 62. As a result, the impedance at the input side of the write driver circuit 442 coincides with the resistance R of the resistor R3. The resistance R, i.e., the impedance R at the output side of the write driver circuit 442, corresponds to the impedance at the transmission path 62.

In the present embodiment, for carrying out the impedance matching between the transmission path 61 (62) and the output side of the preamplifier circuit 441 (the input side of the write driver circuit 442), the impedance setting circuit 445 (446) in each preamplifier IC 44 selectively connects, to the transmission path 61 (62), an impedance element (resistor) having an impedance (a resistance) suitable for the number of preamplifier ICs 44 mounted (on the connection end portion 42a of the relay FPC 42) in the HDD. This enables appropriate impedance matching regardless of the number of mounted preamplifier ICs 44.

In the present embodiment, it is assumed that the minimum and maximum numbers of preamplifier ICs 44 that can be mounted on the connection end portion 42a of the relay FPC 42 is one and two, respectively. When the minimum and maximum numbers of preamplifier ICs 44 that can be mounted are one and four, respectively, the detector 443 would have at least two terminals T. That is, when each preamplifier ICs 44 having two terminals T is mounted on the connection end portion 42a, each of the two terminals T is connected to the ground line or the power source line, depending upon the number of preamplifier ICs 44 (i.e., one, two, three, or four).

More generally speaking, if the minimum and maximum numbers of preamplifier ICs 44 that can be mounted are one and $M=2^m$ (m is one or more integers), respectively, the detector 443 would have at least m terminals T. When each preamplifier ICs 44 having m terminals T is mounted on the connection end portion 42a, each of the m terminals T would be connected to the ground line or the power source line, depending upon the number of preamplifier ICs 44. In this case, the impedance setting circuit 445 (446) would have M resistors that have resistances R, 2×R, . . . , M×R. Each of the M resistors is connected in parallel with the pair of signal lines of the transmission path 61 (62) via a switch (a pair of switches). If the number of preamplifier ICs 44 detected by the detector 443 is n (n=1, 2, . . . , M), the decoder 447 turns on only switches associated with a resistor having a resistance of n×R.

The above embodiment is applied to impedance matching between a transmission path used to transmit a read (write) signal and the output side of the preamplifier circuit 441 (the input side of the write driver circuit 442). However, such a configuration as employed in the above embodiment for the impedance matching is also applicable to impedance matching between a transmission path used to transmit a particular signal other than the read (write) signal and the output side (input side) of a signal processing circuit for sending (receiving) the particular signal to (from) the transmission path.

It is assumed here that the head 18 has a head disk interference (HDI) sensor in addition to the read and write elements. The HDI sensor is also called a head disk interface sensor, and detects a state in which the head 18 contacts the surface of the disk 14. A signal detected by the HDI sensor is also transmitted from an HDI sensor signal processing circuit in the preamplifier IC 44 to an HDI sensor signal processing circuit in the main LSI 54 through a corresponding transmission path (HDI sensor signal transmission path). Therefore, the above-described configuration for the impedance matching may be applied to impedance matching between the HDI sensor signal transmission path and the output side of the HDI sensor signal processing circuit in the preamplifier IC 44.

Also, it is assumed that the HDD employs assist recording, such as high-frequency assist recording or thermal assist recording. In this case, an assist signal for assist recording is transmitted to an assist signal processing circuit in the preamplifier IC 44 through a transmission path (assist signal transmission path). Therefore, the above-described configuration for the impedance matching may be applied to impedance matching between the assist signal transmission path and the input side of the assist signal processing circuit in the preamplifier IC 44.

According to the above-described embodiment, the impedance matching can be carried out regardless of the number of mounted ICs of the same configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit connectable to a signal transmission path of a storage device, comprising:
   an impedance setting circuit including a plurality of switches;
   a detector configured to detect an input signal level; and
   a decoder configured to control one or more of the switches of the impedance setting circuit based on the detected input signal level so as to match an impedance of the integrated circuit with an impedance of the signal transmission path.

2. The integrated circuit according to claim 1, wherein the detector is connected to a terminal and the input signal level is at a first level when the terminal is connected to a power line and at a second level when the terminal is connected to a ground line.

3. The integrated circuit according to claim 1, wherein
   the signal transmission path includes an output signal transmission path and an input signal transmission path, and
   the impedance setting circuit includes a first impedance setting circuit for the output signal transmission path and a second impedance setting circuit for the input signal transmission path.

4. The integrated circuit according to claim 3, wherein
   each of the first and second impedance setting circuits includes a first resistor and a second resistor having a higher resistance than the first resistor.

5. The integrated circuit according to claim 4, wherein the second resistor has twice the resistance of the first resistor.

6. The integrated circuit according to claim 1, wherein the storage device includes a magnetic recording disk, and a read signal or a write signal is transmitted through the signal transmission path.

7. A storage device, comprising:
   one or more magnetic recording heads; and
   one or more pre-amplifier circuits, each connected to the one or more of the magnetic recording heads for transmitting signals thereto or receiving signals therefrom, wherein each of the pre-amplifier circuits includes
   an impedance setting circuit including a plurality of switches;
   a detector configured to detect an input signal level; and
   a decoder configured to control one or more of the switches of the impedance setting circuit based on the detected input signal level.

8. The storage device according to claim 7, wherein
   in each of the pre-amplifier circuits, the detector is connected to a terminal and the input signal level detected by the detector is at a first level when the terminal is connected to a power line and at a second level when the terminal is connected to a ground line.

9. The storage device according to claim 7, further comprising:
   a read signal processing circuit connected to the pre-amplifier circuits over first differential signal line; and
   a write signal processing circuit connected pre-amplifier circuits over second differential signal line, wherein
   in each of the pre-amplifier circuits, the impedance setting circuit includes a first impedance setting circuit connected to the read signal processing circuit and a second impedance setting circuit connected to the write signal processing circuit.

10. The storage device according to claim 9, wherein
    in each of the pre-amplifier circuits, the decoder controls the one or more of the switches of the first impedance setting circuit based on the detected input signal level so as to match an impedance of the pre-amplifier circuit with an impedance of a transmission path between the read signal processing circuit and the pre-amplifier circuit, and controls one or more of the switches of the second impedance setting circuit based on the detected input signal level so as to match an impedance of the pre-amplifier circuit with an impedance of a transmission path between the write signal processing circuit and the pre-amplifier circuit.

11. The storage device according to claim 9, wherein each of the first and second impedance setting circuits includes a first resistor and a second resistor having a higher resistance than the first resistor.

12. The storage device according to claim 11, wherein the second resistor has twice the resistance of the first resistor.

13. A method for setting an impedance of an integrated circuit connected to a signal transmission path of a storage device, the method comprising:
 detecting an input signal level into the integrated circuit; and
 setting an impedance of the integrated circuit based on the detected input signal level so as to match the impedance of the integrated circuit with an impedance of the signal transmission path, wherein
 a voltage level of a terminal is detected as the input signal level, and the terminal is connected to one of a power line and a ground line.

14. The method according to claim 13, wherein
 the signal transmission path includes a read signal transmission path and a write signal transmission path, and the impedance is set separately for the read signal transmission path and the write signal transmission path based on the same input signal level.

15. The method according to claim 13, wherein the impedance is set by controlling switches of an impedance setting circuit.

16. The storage device according to claim 13, wherein the impedance of the integrated circuit comprises a first resistor and a second resistor having a higher resistance than the first resistor.

17. The integrated circuit according to claim 4, wherein
 each of the first and second registers of the first impedance setting circuit is connected to one of the plurality of switches, and
 each of the first and second registers of the second impedance setting circuit is connected to one of the plurality of switches.

18. The storage device according to claim 9, wherein
 each of the first and second registers of the first impedance setting circuit is connected to one of the plurality of switches, and
 each of the first and second registers of the second impedance setting circuit is connected to one of the plurality of switches.

* * * * *